(12) United States Patent
Manoharan

(10) Patent No.: US 8,801,972 B2
(45) Date of Patent: Aug. 12, 2014

(54) ZINC CHALCOGENIDES, DOPED ZINC CHALCOGENIDES, AND METHODS OF MAKING

(75) Inventor: S. Sundar Manoharan, Uttar Pradesh (IN)

(73) Assignee: Indian Institute of Technology Kanpur, Kanpur (IN)

( * ) Notice: Subject to any disclaimer, the term of this patent is extended or adjusted under 35 U.S.C. 154(b) by 334 days.

(21) Appl. No.: 13/371,063

(22) Filed: Feb. 10, 2012

(65) Prior Publication Data

US 2012/0205597 A1  Aug. 16, 2012

(30) Foreign Application Priority Data

Feb. 14, 2011 (IN) .............................. 384/DEL/2011
Apr. 15, 2011 (WO) .................. PCT/IB2011/051641

(51) Int. Cl.
*H01B 1/02* (2006.01)

(52) U.S. Cl.
USPC ..................... 252/519.5; 252/519.4; 427/394; 514/187

(58) Field of Classification Search
USPC .............. 252/519.4, 519.5; 427/394; 514/187
See application file for complete search history.

(56) References Cited

U.S. PATENT DOCUMENTS

| | | | |
|---|---|---|---|
| 3,307,970 A * | 3/1967 | Grier ............................. | 427/394 |
| 6,362,339 B1 | 3/2002 | McCormick | |
| 2007/0090346 A1 | 4/2007 | Jeong et al. | |
| 2007/0166645 A1 | 7/2007 | Jeong et al. | |

OTHER PUBLICATIONS

Akatsuka, K. et al., "Direct analysis of solid samples by atomic absorption spectrometry, following preconcentration of trace elements from seawater with 8-hydroxyquinoline," Fresenius Z Anal Chem, 1987, vol. 329, pp. 453-456.
Choopun, S. et al., "Realization of band gap above 5.0 eV in metastable cubic-phase $Mg_xZn_{1-x}O$ alloy films," Appl. Phys. Lett., Mar. 4, 2002, vol. 80, No. 9, pp. 1529-1531.
Dietl, T. et al., "Zener Model Description of Ferromagnetism in Zinc-Blende Magnetic Semiconductors," Science, Feb. 11, 2000, vol. 287, pp. 1019-1022.
Han, S-J. et al., "Magnetism in Mn-doped ZnO bulk samples prepared by solid state reaction," Applied Physics Letters, Aug. 4, 2003, vol. 83, No. 5, pp. 920-922.
Hummer, K., "Interband Magnetoreflection of $ZnO^{1,}$" Phys. Status Solidi, 1973, vol. 56, pp. 249-260.
International Search Report and Written Opinion for PCT/IB2011/051641, mail date Aug. 5, 2011, 10 pages.
Juiz, S.A. et al., "Thermal Decomposition of the Magnesium, Zinc, Lead and Niobium Chelates Derived from 8-Quinolinol," Journal of Thermal Analysis, 1997, vol. 50, pp. 625-632.

(Continued)

*Primary Examiner* — Khanh Tuan Nguyen
(74) *Attorney, Agent, or Firm* — Foley & Lardner LLP

(57) ABSTRACT

A process of preparing a zinc chalcogenide includes providing a solution of 8-hydroxyquinoline; a zinc precursor; and a reaction solvent; isolating a precipitate from the solution; and calcining the precipitate to form the zinc chalcogenide. Additionally, a polymer composite may include a polymer, bis(8-hydroxyquinolinato)zinc, and elemental sulfur or bis(8-hydroxyquinolinato)$_z$M, wherein M is a metal ion and the value of z is equivalent to the oxidation state of the metal ion.

19 Claims, 3 Drawing Sheets

(56) References Cited

OTHER PUBLICATIONS

Lawes, G. et al., "Absence of ferromagnetism in Co and Mn substituted polycrystalline ZnO," Phys. Rev. B, Jun. 9, 2004, 6 pages.

Liu, C. et al., "Ferromagnetism of ZnO and GaN: A Review," Journal of Materials Science: Materials in Electronics, 2005, vol. 16, pp. 555-597.

Look, D.C., "Recent advances in ZnO materials and devices," Materials Science and Engineering: B, 2001, vol. 80, pp. 383-387.

Mahamuni, S. et al., "Spectroscopic and structural characterization of electrochemically grown ZnO quantum dots," J. Appl. Phys., Mar. 1, 1999, vol. 85, No. 5, pp. 2861-2865.

Mahmoud, M.E. et al., "Surface layer-by-layer chemical deposition reaction for thin film formation of nano-sized metal 8-hydroxyquinolate complexes," Polyhedron, 2009, vol. 28, pp. 181-187.

Makino, T. et al., "Radiative and nonradiative recombination processes in lattice-matched (Cd,Zn)O/(Mg,Zn)O multiquantum wells," Appl. Phys. Lett., Sep. 11, 2000, vol. 77, No. 11, pp. 1632-1634.

Ohtomo, A. et al., "$Mg_xZn_{1-x}O$ as a II-VI widegap semiconductor alloy," Appl. Phys. Lett., May 11, 1998, vol. 72, No. 19, pp. 2466-2468.

Ozgur, U. et al., "A comprehensive review of ZnO materials and devices," J. Appl. Phys., 2005, vol. 98, No. 041301, 103 pages.

Pearton, S.J. et al., "Recent advances in processing of ZnO," J. Vac. Sci. Technol. B, May/Jun. 2004, vol. 22, No. 3, pp. 932-948.

Prinz, G.A., "Magnetoelectronics," Science, Nov. 27, 1998, vol. 282, pp. 1660-1663.

Risbud, A.S. et al., "Magnetism in polycrystalline cobalt-substituted zinc oxide," Phys. Rev. B, 2003, vol. 68, 205202-1-205202-7.

Ryu, Y. et al., "Wide-band gap oxide alloy: BeZnO," Appl. Phys. Lett., 2006, vol. 88, pp. 052103-1-052103-2.

Seshadri, R., "Zinc oxide-based diluted magnetic semiconductors," Current Opinion in Solid State and Materials Science, 2005, vol. 9, pp. 1-7.

Sharma, P. et al., "Ferromagnetism above room temperature in bulk and transparent thin films of Mn-doped ZnO," Nat. Mater., Oct. 2003, vol. 2, pp. 673-677.

Srikant, V. et al., "On the optical band gap of zinc oxide," J. Appl. Phys., May 15, 1998, vol. 83, No. 10, pp. 5447-5451.

Tsukazaki, A. et al., "Quantum Hall Effect in Polar Oxide Heterostructures," Science, Mar. 9, 2007, vol. 315, pp. 1388-1391.

Ueda, K. et al., "Magnetic and electric properties of transition-metal-doped ZnO films," Appl. Phys. Lett., Aug. 13, 2001, vol. 79, No. 7, pp. 988-990.

Wolf, S.A. et al., "Spintronics: A Spin-Based Electronics Vision for the Future," Science, Nov. 16, 2001, vol. 294, pp. 1488-1495.

\* cited by examiner

(12) United States Patent
US 8,801,972 B2

ZINC CHALCOGENIDES, DOPED ZINC CHALCOGENIDES, AND METHODS OF MAKING

CROSS-REFERENCE TO RELATED APPLICATIONS

This application claims the benefit of International Application Serial No. PCT/IB2011/051641, filed on Apr. 15, 2011, and claims the benefit of Indian Application No. 384/DEL/2011, filed on Feb. 14, 2011, the entire disclosures of which are each hereby incorporated by reference for all purposes in their entireties as if fully set forth herein.

FIELD

The technology generally relates to inorganic chalcogenides. In particular, the technology relates to zinc chalcogenides.

BACKGROUND

Wide band gap semi-conducting materials such as zinc oxide and zinc sulfide, as well as their Cd-, Be-, Mn-, and Mg-doped variants find widespread application in the areas of optoelectronics, nanoelectronics, and semiconductors. Despite a broad interest, general synthetic methods to prepare such materials are lacking, due to at least two reasons. First, it is a significant challenge to ensure homogeneous and atomic-scale dispersion of the dopant atom(s) within the zinc oxide or zinc sulfide matrix. Second, it is difficult to prepare zinc oxides, zinc sulfides, or their metal-doped variants in a variety of physical formats such as powders, films, or wires. Moreover, most synthetic methods require stringent processing conditions (e.g., physical and chemical deposition methods), or exceedingly high temperatures.

SUMMARY

In one aspect, a process of preparing a zinc chalcogenide is described including providing a solution including 8-hydroxyquinoline, a zinc precursor, and a reaction solvent. The process further includes isolating a precipitate from the solution and further calcining the precipitate to form the zinc chalcogenide. In another aspect, a composition is provided including bis(8-hydroxyquinolinato)zinc and elemental sulfur.

In another aspect, a composition is provided including bis(8-hydroxyquinolinato) zinc and (8-hydroxyquinolinato)zM, where M is a metal ion and the value of z is equivalent to the oxidation state of the metal ion. In another aspect, a polymer composite is provided including a polymer, bis(8-hydroxyquinolinato)zinc, and (8-hydroxyquinolinato)zM, where M and z are defined above. In yet another aspect, a polymer composite comprising a polymer, bis(8-hydroxyquinolinato)zinc, and elemental sulfur or bis(8-hydroxyquinolinato)zM, wherein M and z are defined above.

DETAILED DESCRIPTION

Figure 1:
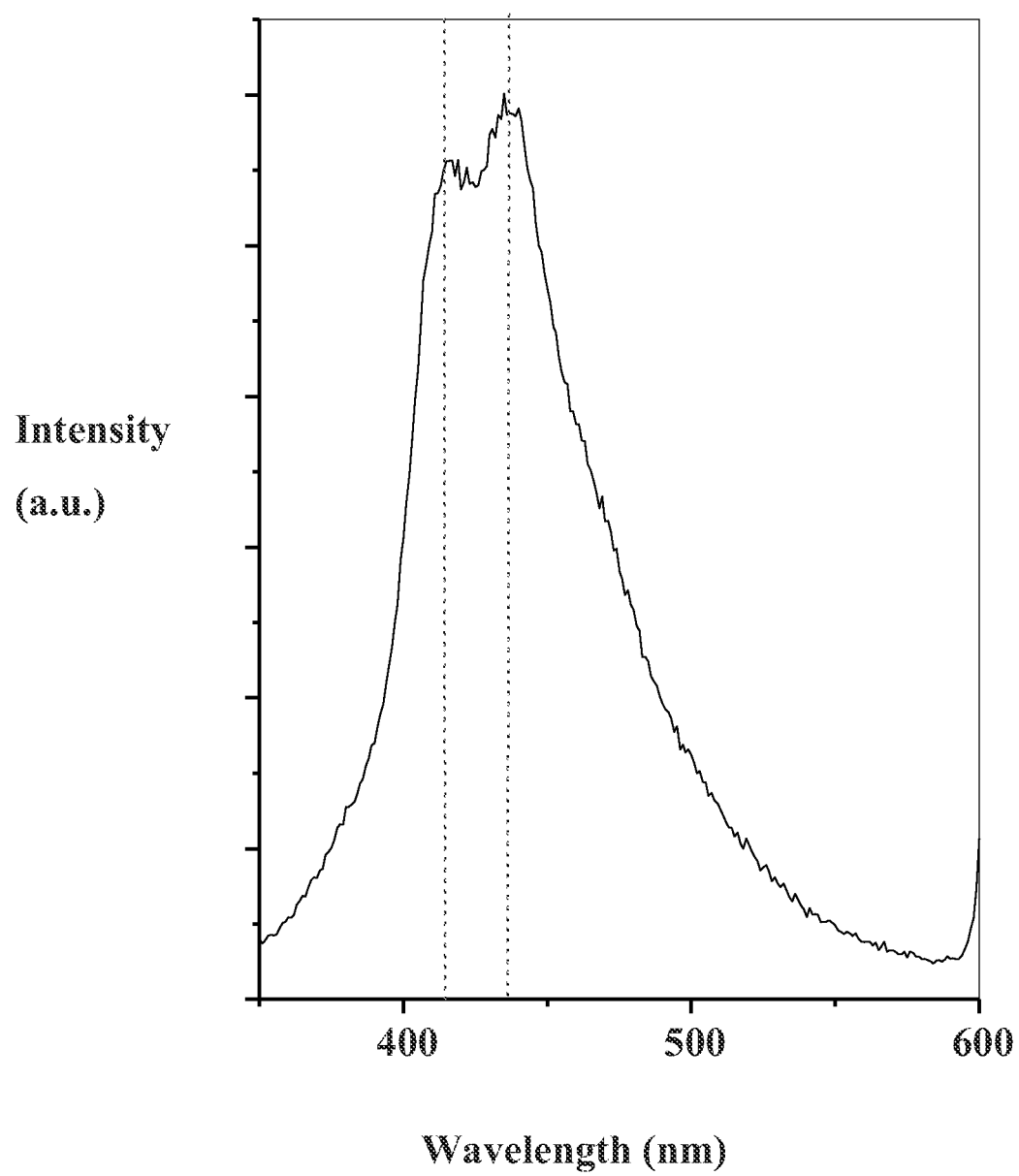
FIG. 1 is a photoluminescence emission spectrum of $Zn_{0.98}Mn_{0.02}O$ powder prepared according to Example 3A, with maxima at ~415 nm and ~438 nm.

Processes for the preparation of zinc oxide and doped zinc oxide include the preparation of zinc compounds which are then calcined. The bidentate ligand, 8-hydroxyquinoline, reacts with a variety of metal ions to give (8-hydroxyquinolinato)metal complexes. The number of quinolinato ligands (anionic two-electron donor ligands) bound to the metal ion is determined by the oxidation state of the metal ion. For example, Sr(II) or Zn(II) precursors (e.g., $SrCl_2$ or $Zn(OEt)_2$), upon reaction with 8-hydroxyquinoline, will give bis(8-hydroxyquinolinato)strontium or bis(8-hydroxyquinolinato)zinc, respectively. Likewise, metal precursors in the +3 oxidation state, will yield tris(8-hydroxyquinolinato)metal complexes.

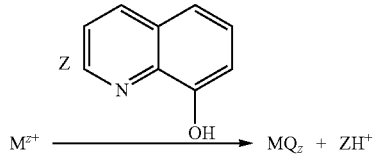

In one aspect, a process is provided including reacting a zinc precursor with 8-hydroxyquinoline in a reaction solvent to yield a precipitate. The precipitate, which includes bis(8-hydroxyquinolinato)zinc, is then isolated.

The zinc precursor used in the reaction may include one or more zinc salts. The only requirement of the zinc salt is that the anion of the zinc salt be capable of being displaced by a ligand (such as 8-hydroxyquinoline or its anionic equivalent). Zinc salts include, but are not limited to, zinc(II) fluoride, zinc(II) chloride, zinc(II) bromide, zinc(II) iodide, zinc(II) acetate, zinc(II) trifluoroacetate, zinc(II) sulfate, zinc(II) perchlorate, zinc(II) phosphate, zinc(II) nitrate, zinc(II) acetate, zinc(II) tetrafluoroborate, zinc(II) hexafluorophosphate, zinc (II) bis(trimethylsilyl)amide, zinc(II) bis(trifluoromethylsulfonyl)imide, zinc(II) cyanide, zinc(II) formate, zinc(II) mesylate, zinc(II) tosylate, zinc carbonate, zinc(II) hydrogencarbonate, etc. In some embodiments, the zinc precursor is zinc(II) chloride, zinc(II) bromide, zinc(II) nitrate, or zinc(II) acetate. The zinc precursor may, alternatively be, or include one or more zinc alkoxides. Such zinc alkoxides have general formula $Zn(OR)_2$, where R is a $C_1$-$C_{10}$ alkyl, $C_1$-$C_{10}$ alkenyl, $C_1$-$C_{10}$ alkynyl, $C_3$-$C_6$ aryl, or a substituted analog thereof. In some embodiments, R is methyl, ethyl, or phenyl. Furthermore, the zinc precursor may, alternatively be, or include one or more diorganozincs. Such diorganozincs have general formula $ZnR_2$, where R is a $C_1$-$C_{10}$ alkyl, $C_1$-$C_{10}$ alkenyl, $C_1$-$C_{10}$ alkynyl, $C_3$-$C_6$ aryl, or a substituted analog thereof. In some embodiments, R is methyl or ethyl.

A variety of reaction solvents may be employed in the process, including, but not limited to, water, alcohols, ethers, glycol ethers, ketones, amides, nitriles, hydrocarbons, halogenated hydrocarbons, or mixtures of any two or more thereof. In some embodiments, the reaction solvent includes, but is not limited to, methanol, ethanol, n-propanol, isopropanol, n-butanol, tert-butanol, diethyl ether, diisopropyl ether, dibutyl ether, tetrahydrofuran, 2-methyltetrahydrofuran, monoglyme, diglyme, acetone, 2-butanone, N,N-dimethylformamide, N,N-dimethylacetamide, N-methylpyrrolidinone, acetonitrile, hexane, toluene, xylenes, dichloromethane or chloroform. In one embodiment, the reaction solvent includes methanol, ethanol, n-propanol, isopropanol, diethyl ether, or a mixture of any two or more thereof. In another embodiment, the reaction solvent includes ethanol.

As will be appreciated by those skilled in the art, the process may include heating the mixture of reactants and solvents at a temperature, and for a time period, sufficient to produce the precipitate, prior to the isolation step. In one embodiment, the solution is heated at an elevated temperature (i.e., a temperature above room temperature), up to and including the refluxing temperature of the reaction solvent. In another embodiment, the solution is heated for a time period of about 10 minutes to about 10 hours, about 30 minutes to about 10 hours, about 10 minutes to about 8 hours, about 30 minutes to about 8 hours, about 1 hour to about 8 hours, about 3 hours to about 8 hours, about 4 hours to about 6 hours, or is about 5 hours. In one embodiment, the time period is about 1 hour to about 8 hours. Furthermore, other steps known in the art may be employed to aid in the formation of the precipitate (e.g., cooling, evaporation, concentration, addition of seed crystals or other precipitants, and the like).

The precipitate thus formed may be isolated or collected from the solution in any number of ways commonly known in the art. For example, the precipitate may be isolated by decantation, centrifugation, filtration, or other similar technique. The isolated precipitate may optionally be washed with an appropriate wash solvent, such as an alcohol or an ether. In one embodiment, the wash solvent is the same as the reaction solvent. The isolated precipitate may be further dried at or below atmospheric pressure to remove residual reaction solvent or wash solvent. Such drying may further include heating the precipitate to a temperature of about 25° C. to about 250° C., to about 50° C. to about 150° C., or to about 25° C. to about 100° C.

After isolation, the precipitate may then be calcined to provide a zinc chalcogenide. As used herein, the term chalcogenide means divalent ion of a Group 16 element, and includes, but is not limited to, oxides, sulfides, selenides, and tellurides. As used herein, the terms "calcine" or "calcination" refers to heating in the presence of air or oxygen. Other gases, such as argon, may also be present. Calcination is typically carried out in ovens, furnaces, reactors, or kilns of various designs including shaft furnaces, rotary kilns, multiple hearth furnaces, fluidized bed reactors, and the like. In one embodiment, calcination is performed at a temperature from about 400° C. to about 2000° C., from about 500° C. to about 1500° C., from about 400° C. to about 1000° C., from about 300° C. to about 1200° C., from about 400° C. to about 1000° C., from about 400° C. to about 800° C., or from about 500° C. to about 600° C. In one embodiment, the zinc chalcogenide is zinc oxide. In one embodiment, the zinc chalcogenide is zinc sulfide.

In one aspect, a solution includes 8-hydroxyquinoline, a zinc precursor, and a reaction solvent. A precipitate is then isolated from the solution and the precipitate is calcined to form a zinc chalcogenide. In one embodiment, the solution further includes a dopant precursor. The precipitate thus formed includes mixed quinolate species, i.e., bis(8-hydroxyquinolinato)zinc and the 8-hydroxyquinolinato complex of the dopant. In this case, the 8-hydroxyquinolinato complex of the dopant is homogeneously dispersed within bis(8-hydroxyquinolinato)zinc on an atomic scale. Thus, the precipitate is a solid solution. As used herein, a "solid solution" is a crystalline material containing a second constituent which fits into and is distributed in the lattice of the host crystalline material. Thus, in one embodiment, the precipitate may be used as a precursor to prepare a zinc chalcogenide where the zinc chalcogenide is a doped zinc oxide. In particular, by calcining the precipitate, a doped zinc oxide is obtained, in which atoms or ions from the 8-hydroxyquinolinato complex of the dopant are likewise homogeneously dispersed within the zinc oxide matrix. Where the dopant precursor includes a metal, the process outlined above provides a solid solution of bis(8-hydroxyquinolinato)zinc and the 8-hydroxyquinolinato complex of the metal in the form of a precipitate. Likewise, this precipitate may be calcined to provide zinc oxide doped with metal atoms or ions, with such metal atoms or ions being dispersed within the zinc oxide on an atomic scale. In some embodiments, the zinc chalcogenide is a doped zinc oxide. In other embodiments, the zinc chalcogenide is a doped zinc sulfide. In other embodiments the doped zinc oxide has the formula Cd:ZnO, or Mn:ZnO.

The dopant precursor may include a metal salt or a metal alkoxide, other than a zinc salt or a zinc alkoxide. If a metal salt is used as the dopant precursor, the only requirement is that the anion of the metal salt be capable of being displaced by a ligand (such as 8-hydroxyquinoline or its anionic equivalent). Thus, the metal salt may include, but is not limited to: a metal fluoride, a metal chloride, a metal bromide, a metal iodide, a metal nitrate, a metal phosphate, a metal sulfate, a metal tetrafluoroborate, a metal hexafluorophosphate, a metal formate, a metal acetate, a metal picrate, a metal triflate, a metal mesylate, a metal sulfonate, a metal bis(trifluoromethylsulfonyl)imide, a metal carbonate, a metal hydrogencarbonate, etc. In some embodiments, the metal salt is a metal nitrate, a metal chloride, or a metal acetate. If a metal alkoxide is used, the only requirement of the metal alkoxide is that the alkoxide anion of the metal alkoxide be capable of being displaced by a ligand (such as 8-hydroxyquinoline or its anionic equivalent). The term "alkoxide" as used herein refers to an —OR group, where R is a $C_1$-$C_{10}$ alkyl, $C_1$-$C_{10}$ alkenyl, $C_1$-$C_{10}$ alkynyl, $C_3$-$C_6$ aryl, or a substituted analog thereof.

Where the dopant precursor is a metal salt or a metal alkoxide, the metal may be, but is not limited to, cadmium, manganese, or nickel. The metal of the metal salt or metal alkoxide may have an oxidation state of +1, +2, +3, +4, +5, or +6. In some embodiments, the dopant precursor is manganese (II) chloride, manganese(II) bromide, cadmium(II) chloride, cadmium(II) bromide, manganese(II) acetate, or cadmium (II) acetate. In some embodiments, the dopant precursor includes a metal salt of manganese or cadmium, or a metal alkoxide of manganese or cadmium.

In other embodiments, two or more dopant precursors are used together and in any proportion. For example, a mixture of manganese(II) chloride, cadmium (II) chloride, and nickel (II) bromide in a 1:2:3 molar ratio may be employed as the dopant precursor. Such a mixture would allow for the preparation of a doped zinc chalcogenide doped with three different ions: manganese(II), cadmium(II), and nickel(II) in unequal proportion. As a second example, a mixture of chromium(II) chloride and chromium(III) nitrate 1:2 ratio may be employed as the dopant precursor. Such a mixture would allow for the preparation of a doped zinc chalcogenide doped with ions of the same element but with different oxidation states: chromium(II) and chromium(III).

If a dopant precursor is included, the molar ratio of the zinc precursor to the dopant precursor may vary, depending upon the desired incorporation of the dopant in the zinc chalcogenide (or in the precipitate, i.e., the solid solution which may be further calcined). In one embodiment, the molar ratio of the zinc precursor to the dopant precursor is from about 1.00:0.01 to about 1.00:0.15, or about 1.00:0.01 to about 1.00:0.05.

Thus, in another aspect, a composition is provided which includes bis(8-hydroxyquinolinato) zinc and bis(8-hydroxyquinolinato)$_z$M, wherein M is a metal ion, and the value of z is equivalent to the oxidation state of the metal ion. In one embodiment, M is an ion of manganese or cadmium and z is two. In another embodiment, the molar ratio of bis(8-hydroxyquinolinato)zinc to bis(8-hydroxyquinolinato)$_z$M is about 1.00:0.01 to about 1:00:0.20 or is about 1.00:0.01 to about 1:00:0.10.

According to another aspect, either the solution including the 8-hydroxyquinoline, a zinc precursor, and a reaction solvent; or the solution including 8-hydroxyquinoline, a zinc precursor, a reaction solvent, and a dopant precursor; may further include a sulfur reagent. If the sulfur reagent is added to the solution including 8-hydroxyquinoline, a zinc precursor, and a reaction solvent, then the precipitate includes bis(8-hydroxyquinolinato)zinc and the sulfur reagent. If the sulfur reagent is added to the solution including 8-hydroxyquinoline, a zinc precursor, a reaction solvent, and a dopant precursor, then the precipitate formed includes bis(8-hydroxyquinolinato)zinc, the 8-hydroxyquinolinato complex of the dopant, and the sulfur reagent. Where the dopant precursor includes a metal salt or metal alkoxide, the precipitate includes bis(8-hydroxyquinolinato)zinc, the 8-hydroxyquinolinato complex of the metal and the sulfur reagent. As used herein, the term "sulfur reagent" includes, but is not limited to: elemental sulfur, thiourea, alkali sulfides, alkali polysulfides, alkali hydrosulfides, quaternary ammonium sulfides, quaternary ammonium polysulfides, quaternary ammonium hydrosulfides, organic polysulfides, or thiols of the formula R—SH, wherein R is a $C_1$-$C_{10}$ alkyl, $C_1$-$C_{10}$ alkenyl, $C_1$-$C_{10}$ alkynyl, $C_3$-$C_6$ aryl, or a substituted analog thereof. In some embodiments, the sulfur reagent is elemental sulfur, a thiol, or thiourea.

Thus, according to one aspect, a composition includes bis(8-hydroxyquinolinato)zinc and elemental sulfur. In another aspect, a composition is provided including bis(8-hydroxyquinolinato)zinc, bis(8-hydroxyquinolinato)$_z$M and elemental sulfur, wherein M is a metal ion, and the value of z is equivalent to the oxidation state of the metal ion.

Calcination of a precipitate including a sulfur reagent yields a zinc chalcogenide of the formula $ZnO_yS_{1-y}$ where y is a non-negative integer or non-integer value greater or equal to zero and less than 1. In some embodiments, the value of y is 0, 0.01, 0.05, 0.1, 0.2, 0.3, 0.4, 0.5, 0.6, 0.7, 0.8, 0.9. In one embodiment, the y is 0 and the zinc chalcogenide is ZnS. In another embodiment, the zinc chalcogenide is of the formula $M_wZn_{13}O_yS_{1-y}$ where M is a metal ion, w is a non-negative integer or non-integer less than 1, and y is a non-negative integer or non-integer value greater or equal to zero and less than 1. Such a doped zinc chalcogenide may be readily prepared addition of both a sulfur reagent and either a metal salt or a metal alkoxide to a solution including 8-hydroxyquinoline, a zinc precursor, and a reaction solvent to form a precipitate, isolating the precipitate, and calcining the precipitate.

According to another aspect, any of the above precipitates or zinc chalcogenides may be obtained in the form of thin films. In such a process, the precipitate is dissolved in a suitable solvent and casted into a thin film on a substrate using conventional casting methods. In some embodiments, a thin film is produced by spin-casting. Calcination of the resultant thin film provides a corresponding zinc chalcogenide as a thin film. In some embodiments, the zinc chalcogenide is ZnO, a doped zinc oxide, ZnS, or a doped zinc sulfide, or $M_wZn_{1-w}O_yS_{1-y}$.

In other embodiments, any of the precipitates or zinc chalcogenides may be prepared in the form of nanofibers. In particular, after isolating a precipitate, the precipitate may be further combined with a polymer to form a polymer composite. The precipitate and polymer may be combined by dissolution of each in a solvent followed by mixing and subsequent solvent evaporation, by adding the precipitate to a liquid or molten polymer, or by other means. In one embodiment, a polymer composite is provided including a polymer, bis(8-hydroxyquinolinato)zinc, and elemental sulfur or bis(8-hydroxyquinolinato)$_z$M, wherein M is a metal ion and the value of z is equivalent to the oxidation state of the metal ion. In another embodiment, a polymer composite includes a polymer, bis(8-hydroxyquinolinato)zinc, and bis(hydroxyquinolinato)$_z$M, wherein M is a metal ion and the value of z is equivalent to the oxidation state of the metal ion. In one embodiment of the polymer composite, M is an ion of manganese or cadmium and z is two. In another embodiment, the polymer may be polyvinylpyrrolidone or polyvinyl alcohol. In yet another embodiment, the weight ratio of precipitate to polymer is from about 0.01:1.00 to about 0.50:1.00, or from about 0.02:1.00 to about 0.30:1.00. Fibers or nanofibers may be prepared from the polymer composite. In one embodiment, fibers or nanofibers of the polymer composite may be prepared through electrospinning techniques. Subsequent calcination of the polymer composite nanofibers provides the zinc chalcogenides in the form of nanofibers. In some embodiments, the zinc chalcogenide is ZnO, a doped zinc oxide, ZnS, or a doped zinc sulfide, or $M_wZn_{1-w}O_yS_{1-y}$.

Those of skill in the art will appreciate that the above process for obtaining precipitates may be modified in a number of ways. For example, while the above process employs both an zinc precursor and a dopant precursor in the presence of 8-hydroxyquinoline in a reaction solvent, it is also possible to use bis(8-hydroxyquinolinato)zinc directly along with a dopant precursor in the presence of 8-hydroxyquinoline in a reaction solvent. In such a case, 8-hydroxyquinoline need only be added in sufficient quantity to react with the dopant precursor, since zinc is "pre-complexed" to the quinoline ligand. Following the same reasoning, the dopant may be pre-complexed to the quinoline ligand and a zinc precursor used in the presence of 8-hydroxyquinoline in a reaction solvent. In a third alternative, both the bis(8-hydroxyquinolinato)zinc complex and the 8-hydroxyquinolinato dopant complex may be added to a solvent (such as the reaction solvents described herein), dissolved, and precipitated to give the precipitate.

EXAMPLES

The present technology, thus generally described, will be understood more readily by reference to the following examples, which is provided by way of illustration and is not intended to be limiting of the present technology.

Example 1

General procedure for preparation of $Znq_2$. To a stirring solution of a $ZnCl_2$ (1.36 g, 9.98 mmol) in ethanol (20 mL) was added 8-hydroxyquinoline (2.9032 g, 20.02 mmol). $Zn(OAc)_2 \cdot 2H_2O$ (2.19 g, 9.98 mmol) could also be substituted for $ZnCl_2$ with equal effectiveness. The reaction mixture or solution was refluxed at about 60° C. for approximately 5 hours. After cooling to room temperature, the resultant $Znq_2$ was collected as a precipitate. The precipitate was washed and dried in vacuo. Analysis of the $Znq_2$ precipitate by X-ray diffraction revealed a simple cubic phase for hydrated $Znq_2$.

The $Znq_2$ was further analyzed by thermal gravimetric analysis. The thermogram of this material indicated a two-step decomposition of $Znq_2$, with the decomposition to ZnO occurring below 500° C. The peak emission wavelength of $Znq_2$, as determined by photoluminescence spectroscopy, was in agreement with that of the reported literature value ($\lambda_{max}$=535 nm). This green-yellow emission had a quantum efficiency comparable to that of $Alq_3$. Finally, SEM imaging of $Znq_2$ revealed the material to be a highly crystalline material, with the crystals generally being unagglomerated and monodisperse in size.

Example 2

Preparation of solid solutions using a zinc precursor. The preparation was similar to the procedure described in Example 1, but a dopant precursor was also added to the solution. To a stirring solution of $ZnCl_2$ ($ZnBr_2$, $Zn(NO_3)_2$, $Zn(OAc)_2$, or similar zinc(II) precursers could also be used) in ethanol was added a dopant precursor followed by 8-hydroxyquinoline. The quantity of dopant precursor was adjusted based upon the desired level of incorporation of the dopant in the solid solution. 8-Hydroxyquinoline was added in sufficient quantity to ensure essentially complete consumption of both the zinc precursor and the dopant precursor. The order of addition was immaterial. The reaction mixture or solution was refluxed at about 60° C. for approximately 5 hours. After cooling to room temperature, the resultant solid solution was collected as a precipitate. The precipitate was washed and dried in vacuo.

TABLE 1

Solid Solutions Prepared According to Example 2.

| Entry | Dopant Precursor | General Solid Solution Formula | Specific Solid Solution Prepared | Atom Percent of Dopant |
|---|---|---|---|---|
| 1 | $MnCl_2$ | $Mn_xZn_{1-x}q_2$ | $Mn_{0.02}Zn_{0.98}q_2$ | 2 |
| 2 | $CdCl_2$ | $Cd_xZn_{1-x}q_2$ | $Cd_{0.1}Zn_{0.9}q_2$ | 10 |
| 3 | $CdCl_2$ | $Cd_xZn_{1-x}q_2$ | $Cd_{0.2}Zn_{0.8}q_2$ | 20 |
| 4 | $NiCl_2$ | $Ni_xZn_{1-x}q_2$ | $Ni_{0.05}Zn_{0.95}q_2$ | 5 |
| 5 | $NiCl_2$ | $Ni_xZn_{1-x}q_2$ | $Ni_{0.1}Zn_{0.9}q_2$ | 10 |
| 6 | $NiCl_2$ | $Ni_xZn_{1-x}q_2$ | $Ni_{0.15}Zn_{0.85}q_2$ | 15 |
| 7 | $NiCl_2$ | $Ni_xZn_{1-x}q_2$ | $Ni_{0.2}Zn_{0.8}q_2$ | 20 |
| 8 | $MgCl_2$ | $Mg_xZn_{1-x}q_2$ | $Mg0_{0.05}Zn_{0.95}q_2$ | 5 |
| 9 | $MgCl_2$ | $Mg_xZn_{1-x}q_2$ | $Mg0_{0.1}Zn_{0.95}q_2$ | 10 |
| 10 | $MgCl_2$ | $Mg_xZn_{1-x}q_2$ | $Mg0_{0.15}Zn_{0.95}q_2$ | 15 |
| 11 | $MgCl_2$ | $Mg_xZn_{1-x}q_2$ | $Mg0_{0.20}Zn_{0.95}q_2$ | 20 |
| 12 | $MgCl_2$ | $Mg_xZn_{1-x}q_2$ | $Mg0_{0.25}Zn_{0.95}q_2$ | 25 |

The solid solutions were analyzed by powder x-ray diffraction (XRD) and scanning electron microscopy (SEM). The XRD patterns of all the solid solutions were very similar, closely resembling the XRD pattern of $Znq_2$, thus indicating that each solid solution was isomorphous in nature and further that each possessed the crystallographic morphology of $Znq_2$. Thus, the solid solutions were isostructural with that of $Znq_2$. The SEM micrographs revealed the solid solutions of Mn:$Znq_2$ and Cd:$Znq_2$ and to be highly crystalline materials, like $Znq_2$. While the shape and morphology varied with the composition, the crystals of any given solid solution were generally unagglomerated and monodisperse in size.

The solubilities of $Znq_2$ and the solid solutions were evaluated (Table 2). In general, each exhibited at least some solubility in ethanol, dichloromethane, N,N-dimethylformamide (DMF), or chloroform. Solubility of the solid solutions is a useful property for production of thin films and fibers of the precursors, and thus thin films and fibers of doped zinc oxides.

TABLE 2

Solubilities of $Znq_2$ and the Solid Solutions.

| | $Znq_2$ or | Solubility* | | | |
|---|---|---|---|---|---|
| Entry | Solid Solution | $C_2H_5OH$ | $CH_2Cl_2$ | DMF | $CHCl_3$ |
| 1 | $Znq_2$ | NS | PS | PS | PS |
| 2 | Mn:$Znq_2$ | NS | PS | PS | PS |
| 3 | Cd:$Znq_2$ | NS | PS | NS | NS |
| 4 | Ni:$Znq_2$ | PS | PS | PS | PS |

*NS: not soluble; PS: partially soluble

Example 3

General preparation of zinc chalcogenides. In general, $Znq_2$ (Example 1) or the solid solutions (Example 2) may be decomposed with heating and/or calcination in the presence of air or oxygen to give ZnO or doped zinc oxides respectively. Typically, the heating or calcination was performed below 600° C., usually between 400-600° C. Depending on the manner of processing the solid solutions, ZnO or doped zinc oxides may be obtained in various forms, including powders, films, or fibers. Notably, regardless of the form, the composition of the doped zinc oxides remains the same. The procedures for obtaining these various forms of doped zinc oxides from their solid solution counterparts are detailed below.

Example 3A

Preparation of bulk powders from solid solutions. Direct calcination of $Znq_2$ (Example 1) or the solid solutions (Example 2) in the presence of air oxygen, afforded the corresponding ZnO or doped zinc oxides respectively, in the form of bulk powders as indicated in Table 3.

TABLE 3

Bulk Powders Prepared Through Calcination of $Znq_2$ or Solid Solutions

| Entry | $Znq_2$ or Solid Solution | Bulk Powder |
|---|---|---|
| 1 | $Znq_2$ | ZnO |
| 2 | $Mn_{0.02}Zn_{0.98}q_2$ | $Mn_{0.02}Zn_{0.98}O$ |
| 3 | $Cd_{0.1}Zn_{0.9}q_2$ | $Cd_{0.1}Zn_{0.9}O$ |
| 4 | $Cd_{0.2}Zn_{0.8}q_2$ | $Cd_{0.2}Zn_{0.8}O$ |
| 5 | $Ni_{0.1}Zn_{0.9}q_2$ | $Ni_{0.1}Zn_{0.9}O$ |
| 6 | $Ni_{0.2}Zn_{0.8}q_2$ | $Ni_{0.2}Zn_{0.8}O$ |

The ZnO powder prepared in this fashion was analyzed by x-ray diffraction (XRD), photoluminescence spectroscopy, and scanning electron microscopy (SEM). The XRD diffractogram revealed the ZnO to be single phase, crystallizing in hexagonal symmetry. The photoluminescence spectrum revealed a sharp and significant band edge emission at 380 nm associated with the radiative recombination of a hole in the valence band and an electron in the conduction band (i.e., excitonic emission). Notably, there was no emission observed in the 500 nm region. Emission in this region typically arises from oxygen vacancy defects and the presence of interstitial Zn ions within ZnO. Without being bound by any particular theory, it is believed that morphology of the ZnO powder prepared in the present manner gives rise to such preferable emission characteristics (i.e., limited or no defect emission). The SEM micrograph of the ZnO powder, showed the powder to be comprised of monodisperse crystals.

The doped zinc oxides powders were analyzed by x-ray diffraction (XRD) and scanning electron microscopy (SEM) as well. The XRD diffractograms revealed the various doped zinc oxides to be single phase, highly crystalline, and chemically homogenous. The XRD patterns of all the doped zinc oxide powders were very similar, strongly resembling the XRD pattern of undoped ZnO, thus indicating that each doped zinc oxide was isomorphous in nature and further that each possessed the crystallographic morphology of ZnO. Thus, the doped zinc oxides were isostructural with that of undoped ZnO. The SEM micrographs confirmed the doped zinc oxides to be highly crystalline, and further indicated the morphology, size, and shape of the crystallites to be dependent on the identity of the solid solution. Most of the crystallites were approximately 100-200 nm in size and were loosely bound with minimal aggregation.

A plot magnetization versus magnetic field for the doped zinc oxide $Mn_{0.02}Zn_{0.98}O$ clearly showed a field induced magnetization at 300 K, in close agreement with the literature (Dietl et al. *Science* (2000), 287, 1019). Thus, it can be concluded that the present methods provide for highly effective and controlled atomic level doping of metal atoms such as Mn within zinc oxide. FIG. 1 shows the photoluminescence spectrum of $Mn_{0.02}Zn_{0.98}O$ which was also obtained and analyzed. The incorporation of $Mn^{2+}$ ions results in a slight shifting of the emission band (to 400-450 nm) relative to that of the undoped ZnO (about 380 nm). Like the ZnO prepared in Example 3A, the absence of yellow-green emission in the 500 nm region was observed for $Mn_{0.02}Zn_{0.98}O$, further corroborating that this material is homogeneously doped with $Mn^{2+}$ ions and lacks defects.

Figure 2:
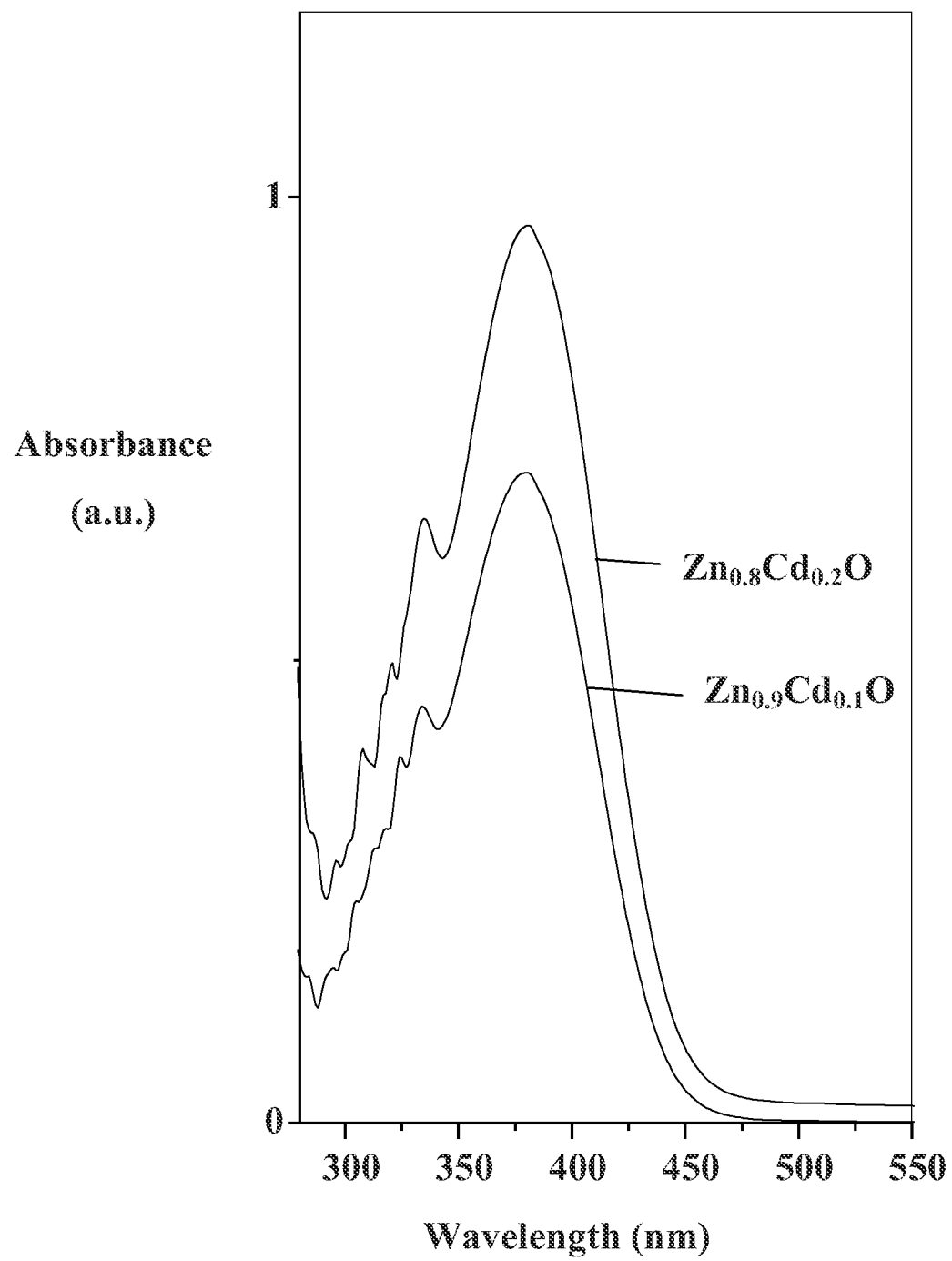
FIG. 2 are overlaid absorbance spectra of $Zn_{0.9}Cd_{0.1}O$ powder and $Zn_{0.8}Cd_{0.2}O$ powder prepared according to Example 3A.
Figure 3:
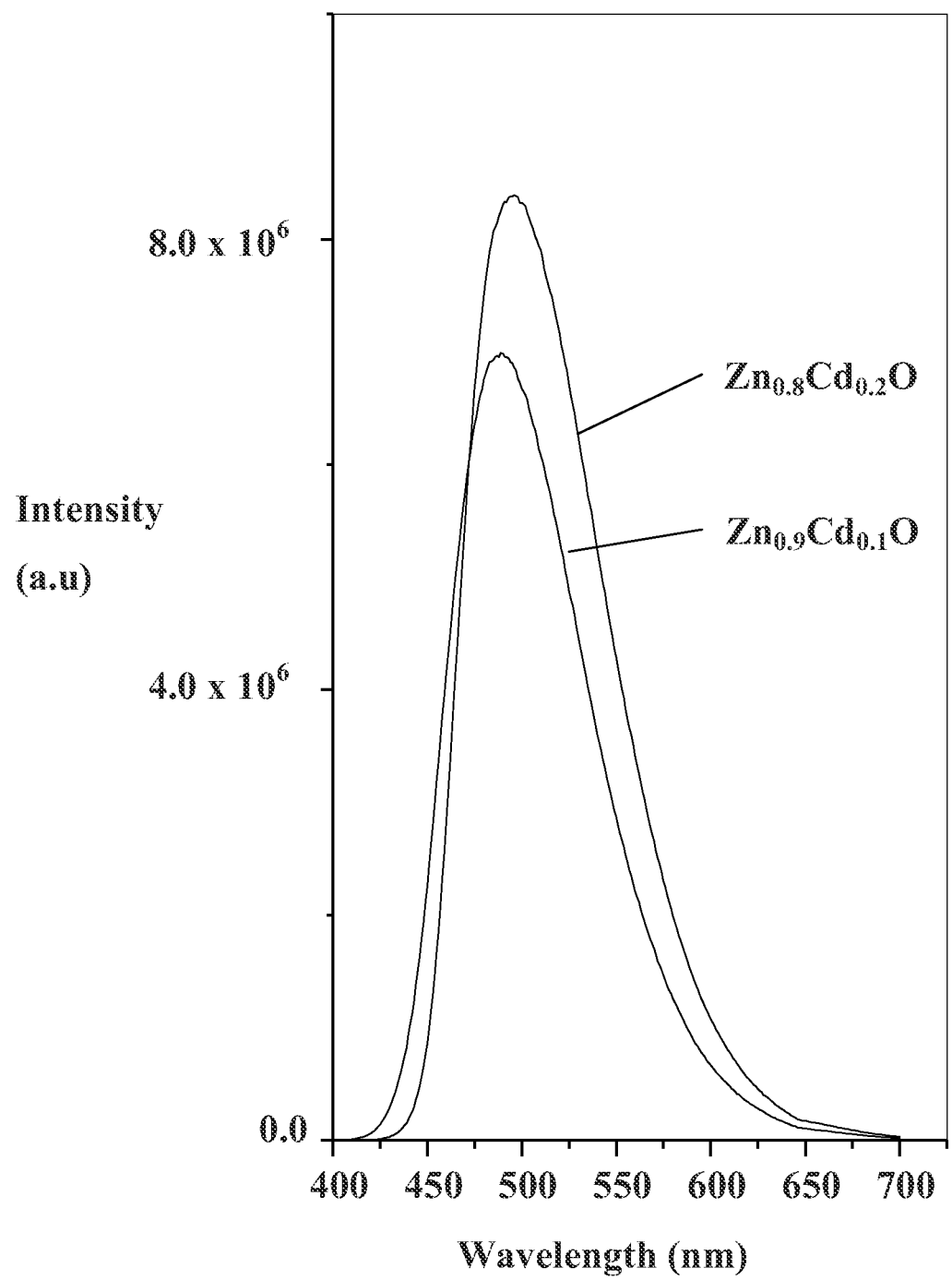
FIG. 3 is a graph of overlaid photoluminescence emission spectra of $Zn_{0.9}Cd_{0.1}O$ powder and $Zn_{0.8}Cd_{0.2}O$ powder prepared according to Example 3A.

Preparation of doped zinc oxides as presented herein allows for the straight-forward tuning of physical and optical properties of doped zinc oxides. Of particular interest is band engineering of optoelectronic materials. For example, increasing the $Cd^{2+}$ dopant percentage in cadmium-doped zinc oxide from 10% to 20% results in a red-shifting of the absorbance band towards the visible spectrum as a result of the increased cadmium doping (the absorbance of $Zn_{0.8}Cd_{0.2}O$ is red-shifted relative to the absorbance of $Zn_{0.9}Cd_{0.1}O$; see FIG. 2). Similarly, the emission band also shifts red in the photoluminescence spectrum (the emission of $Zn_{0.8}Cd_{0.2}O$ is red-shifted relative to the absorbance of $Zn_{0.9}Cd_{0.1}O$; see FIG. 3).

Example 3B

Preparation of thin films generally. Thin films of either $Znq_2$, the solid solutions, ZnO or the doped zinc oxides are easily prepared. In such a process, $Znq_2$ or a solid solution is dissolved in a suitable solvent (including, but not limited to, those indicated in Table 2) and cast into a thin film on to a substrate using conventional casting methods, including spin-casting. Where necessary to increase solubility of $Znq_2$ or a solid solution, mixed solvent systems may be employed. Calcination of the $Znq_2$ or solid solution thin film provides the corresponding ZnO or doped zinc oxide in film form. The ZnO or doped zinc oxide thin film formed in this manner will have the same composition of as that of the corresponding bulk powder.

Example 3C

Preparation of fibers generally. Fibers (including nanofibers and wires) of $Znq_2$, the solid solutions, and zinc chalcogenides including ZnO or doped zinc oxides may be readily obtained through conventional electrospinning techniques. In this procedure, $Znq_2$ or a solid solution is combined with a polymer such as polyvinylpyrrolidone or polyvinyl alcohol to form a polymer composite. The resultant polymer composite is then electrospun to yield polymer composite fibers. The polymer composite fibers are further calcined to produce either ZnO fibers or doped zinc oxide fibers.

Preparation of $Znq_2$ and ZnO nanofibers through spin-casting of $Znq_2$-polymer composites. $Znq_2$ (0.3-1.5 g) was dissolved in a minimum quantity of dichloromethane (1-3 mL) to provide a first solution. To this first solution was added a second solution of a polymer (either polyvinylpyrrolidone (8.5 g) or polyvinyl alcohol (9.7 g)) in dichloromethane (5 mL). The resultant solution was stirred at room temperature for 1-2 hours, then loaded into a plastic syringe and further injected into an electospinning apparatus at an applied voltage of 12-15 kV to provide $Znq_2$-polymer composite nanofibers of either $Znq_2$-polyvinylpyrrolidone or $Znq_2$-polyvinyl alcohol depending on the polymer used. The resultant nanofibers were collected on aluminum foil or silicon wafers. The nanofibers were calcined at a temperature of 400° C. for a period of about 2 hours to remove the polymer matrix and any other volatile materials. The nanofibers were further calcined at temperature of 600° C. for a period of about 5 hours to provide ZnO nanofibers. The above procedure may be extended to polymer composites including the solid solutions to provide nanofibers of the solid solution-polymer composite, as well as nanofibers of doped zinc oxides.

Example 4

Preparation of zinc chalcogenides and doped zinc chalcogenides other than ZnO or doped zinc oxides. In the procedure used to prepare $Znq_2$ (i.e., Example 1) or in the procedure used to prepare the solid solutions (i.e., Example 2), a sulfur reagent such as elemental sulfur, organic thiols, thio-urea, sulfide salts, etc. may be further included into the reaction. Such procedures provide either $Znq_2$ or a solid solution each of which includes sulfur reagent. Calcination of either $Znq_2$ or the solid solutions each of which further includes the sulfur reagent provides ZnS or doped zinc sulfides respectively (in the form of powders, analogous to Example 3A). Thin films and fibers may be prepared employing the procedures as set forth in Examples 3B and 3C to provide (i) $Znq_2$ with the sulfur reagent in the form of a thin film or fiber, (ii) ZnS in the form of a thin film or fiber, (iii) a solid solution with the sulfur reagent in the form of thin film or wire, or (iv) a doped zinc sulfide in the form of thin films or wire.

EQUIVALENTS

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent compositions, apparatuses, and methods within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

Other embodiments are set forth in the following claims.

What is claimed is:

1. A process of preparing a doped zinc chalcogenide, the process comprising:
   providing a solution comprising 8-hydroxyquinoline; a zinc precursor; a dopant precursor; and a reaction solvent;
   isolating a precipitate from the solution; and
   calcining the precipitate to form the doped zinc chalcogenide.

2. The process of claim 1, wherein the zinc precursor is a zinc salt.

3. The process of claim 1, wherein the zinc precursor is zinc chloride, zinc bromide, zinc nitrate, or zinc acetate.

4. The process of claim 1, wherein the reaction solvent is an alcohol or an ether.

5. The process of claim 1, further comprising heating the solution at a temperature, and for a time period, sufficient to produce the precipitate, prior to the isolating step.

6. The process of claim 5, wherein the temperature is the refluxing temperature of the reaction solvent.

7. The process of claim 5, wherein the time period is about 10 minutes to about 10 hours, about 30 minutes to about 10 hours, about 10 minutes to about 8 hours, about 30 minutes to about 8 hours, about 1 hour to about 8 hours, about 3 hours to about 8 hours, about 4 hours to about 6 hours, or is about 5 hours.

8. The process of claim 1, further comprising washing the precipitate with a wash solvent before the calcining step and after the isolating step.

9. The process of claim 8, wherein the wash solvent is an alcohol or an ether.

10. The process of claim 1, wherein the doped zinc chalcogenide is a doped zinc oxide.

11. The process of claim 10, wherein the doped zinc chalcogenide is Cd:ZnO or Mn:ZnO.

12. The process of claim 1, wherein the dopant precursor comprises a metal salt or metal alkoxide.

13. The process of claim 1, wherein the dopant precursor comprises manganese(II) chloride, manganese(II) bromide, cadmium(II) chloride, cadmium(II) bromide, manganese(II) Acetate, cadmium(II) Acetate.

14. The process of claim 1, wherein the solution further comprises a sulfur reagent.

15. The doped zinc chalcogenide prepared by the process of claim 14.

16. The process of claim 14, wherein the sulfur reagent is elemental sulfur, a thiourea, an alkali sulfide, an alkali polysulfide, an alkali hydrosulfide, a quaternary ammonium sulfide, a quaternary ammonium polysulfide, a quaternary ammonium hydrosulfide, an organic polysulfide, or a thiol of the formula R—SH, wherein R is a $C_1$-$C_{10}$ alkyl, $C_1$-$C_{10}$ alkenyl, $C_1$-$C_{10}$ alkynyl, $C_3$-$C_6$ aryl, or a substituted analog thereof.

17. The process of claim 1, wherein the doped zinc chalcogenide is a doped zinc sulfide.

18. The process of claim 1 further comprising combining the precipitate with a polymer before the calcining step and after the isolating step to form a polymer composite.

19. The doped zinc chalcogenide prepared by the process of claim 1.

* * * * *

UNITED STATES PATENT AND TRADEMARK OFFICE
CERTIFICATE OF CORRECTION

PATENT NO. : 8,801,972 B2  Page 1 of 1
APPLICATION NO. : 13/371063
DATED : August 12, 2014
INVENTOR(S) : Manoharan It is certified that error appears in the above-identified patent and that said Letters Patent is hereby corrected as shown below:

In the Specification

In Column 5, Line 49, delete "$M_w Zn_{13} O_y S_{1-y}$" and insert -- $M_w Zn_{1-w} O_y S_{1-y}$ --, therefor.

In Column 9, Line 25, delete "$Mn^{2'}$" and insert -- $Mn^{2+}$ --, therefor.

In Column 9, Line 36, delete "$Cd^{2'}$" and insert -- $Cd^{2+}$ --, therefor.

Signed and Sealed this
Sixth Day of January, 2015

Michelle K. Lee
*Deputy Director of the United States Patent and Trademark Office*